(12) United States Patent
Delaney et al.

(10) Patent No.: US 11,044,285 B1
(45) Date of Patent: Jun. 22, 2021

(54) METHOD OF PROVIDING SECURE AD HOC COMMUNICATION AND COLLABORATION TO MULTIPLE PARTIES

(71) Applicant: Berryville Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US)

(73) Assignee: Berryville Holdings, LLC, Herndon, VA (US)

( * ) Notice: Subject to any disclaimer, the term of this patent is extended or adjusted under 35 U.S.C. 154(b) by 0 days.

(21) Appl. No.: 16/510,140

(22) Filed: Jul. 12, 2019

Related U.S. Application Data

(60) Provisional application No. 62/697,543, filed on Jul. 13, 2018.

(51) Int. Cl.
| | |
|---|---|
| *H04L 29/06* | (2006.01) |
| *G06Q 10/10* | (2012.01) |
| *H04L 12/58* | (2006.01) |
| *H04L 29/08* | (2006.01) |

(52) U.S. Cl.
CPC ......... *H04L 65/403* (2013.01); *G06Q 10/103* (2013.01); *H04L 51/04* (2013.01); *H04L 65/1073* (2013.01); *H04L 67/02* (2013.01)

(58) Field of Classification Search
CPC ... H04L 65/403; H04L 51/04; H04L 65/1073; H04L 67/02; H04L 29/06; H04L 12/58; H04L 29/08; G06Q 10/103; G06Q 10/10

USPC .......... 709/204; 370/260; 707/770; 715/759
See application file for complete search history.

(56) References Cited

U.S. PATENT DOCUMENTS

| | | | |
|---|---|---|---|
| 10,157,275 B1* | 12/2018 | Venkatasamy | G06F 21/42 |
| 2013/0041824 A1* | 2/2013 | Gupta | G06Q 20/14 |
| | | | 705/44 |
| 2015/0163206 A1* | 6/2015 | McCarthy | G06F 21/10 |
| | | | 713/171 |
| 2016/0342665 A1* | 11/2016 | Lane | G06F 3/0484 |
| 2017/0272316 A1* | 9/2017 | Johnson | G06Q 10/103 |
| 2019/0275434 A1* | 9/2019 | Chandrasekaran | G06T 13/20 |

* cited by examiner

*Primary Examiner* — Minh Chau Nguyen
*Assistant Examiner* — Mehulkumar J Shah
(74) *Attorney, Agent, or Firm* — Jones Day

(57) ABSTRACT

Systems and methods for facilitating communication between users of a collaboration service on a private network are presented. A first server is configured to host the collaboration service. A first client device corresponds to a registered user of the collaboration service. The first client device is in direct communication with the first server to use the collaboration service. An application portal instance is configured and deployed by a second server. The application portal instance is configured to directly connect to the first server. The application portal instance provides an indirect connection to the first server. The indirect connection is hidden from users of the system. A second client device corresponds to a non-registered user of the collaboration service. The second client device connects directly to the application portal instance. The first client device and the second client device communicate over the private network using the collaboration service.

15 Claims, 6 Drawing Sheets

METHOD OF PROVIDING SECURE AD HOC COMMUNICATION AND COLLABORATION TO MULTIPLE PARTIES

CROSS-REFERENCE TO RELATED APPLICATIONS

This application claims priority to U.S. Provisional Application No. 62/697,543, filed Jul. 13, 2018, entitled "Method of Providing Secure Ad Hoc Communication and Collaboration to Multiple Parties," which is incorporated herein by reference in its entirety.

TECHNICAL FIELD

The technology described herein relates to secure communications and more particularly to secure communications between parties using a collaboration service.

BACKGROUND

Collaborative applications allow people to work together, but typically require one of two methods of access: 1) each user has a native application installed on a client device; or 2) each user has an account on a web-based service portal, to which the user logs in to access the service. This requirement can make ad hoc collaboration cumbersome between people who are already registered with a particular collaboration service and people who are not registered. For example, the user who is not already registered with the service may be required to create an account, download and install an application, log in, connect with the registered user, and ultimately, begin to collaborate.

SUMMARY

A system for facilitating communication between users of a collaboration service on a private network is presented. A first server is configured to host the collaboration service. A first client device corresponds to a registered user of the collaboration service. The first client device is in direct communication with the first server to use the collaboration service. An application portal instance is configured and deployed by a second server. The application portal instance is configured to directly connect to the first server. The application portal instance provides an indirect connection to the first server, and the indirect connection is hidden from users of the system. A second client device corresponds to a non-registered user of the collaboration service. The second client device connects directly to the application portal instance. The first client device and the second client device communicate over the private network using the collaboration service.

As another example, a method for facilitating communication between users of a collaboration service on a private network is presented. A request is received from a first client device to communicate with a second client device. The first client device corresponds to a registered user of the collaboration service. The second client device corresponds to a non-registered user of the collaboration service. A direct connection with the first client device is established. The direct connection enables the first client device to use the collaboration service. An application portal instance is configured and deployed. The application portal instance provides an indirect connection to use the collaboration service. The indirect connection is hidden from users of the system. A hyperlink is provided to the second client device. The hyperlink is used by the second client device to connect to the application portal instance. The first client device and the second client device communicate over the private network using the collaboration service.

As a further example, a computer-readable medium is encoded with instructions for commanding one or more data processors to execute steps of a method for facilitating communication between users of a collaboration service on a private network is presented. A request is received from a first client device to communicate with a second client device. The first client device corresponds to a registered user of the collaboration service. The second client device corresponds to a non-registered user of the collaboration service. A direct connection with the first client device is established. The direct connection enables the first client device to use the collaboration service. An application portal instance is configured and deployed. The application portal instance provides an indirect connection to use the collaboration service. The indirect connection is hidden from users of the system. A hyperlink is provided to the second client device. The hyperlink is used by the second client device to connect to the application portal instance. The first client device and the second client device communicate over the private network using the collaboration service.

DETAILED DESCRIPTION

Methods and systems presented herein provide reliable, secure, instantaneous communications for users, registered and non-registered, who wish to communicate with each other using a collaboration service. The collaboration service could provide any one or more of the following features: video conferencing; voice group conferencing; person-to-person telephony; group text chat rooms; person-to-person text chat; file sharing in either direction; sender-controlled email that can be read and replied to, but not saved or forwarded; and virtual desktop infrastructure. Users of the methods and the systems can communicate with each other within the context of a private network, and new users can be incorporated ad hoc into the private network in a secure, non-disruptive manner. A new user can communicate using the system without downloading or installing software applications, creating an account, or logging in to the system. Thus, impediments to collaboration may be mitigated.

Figure 1:
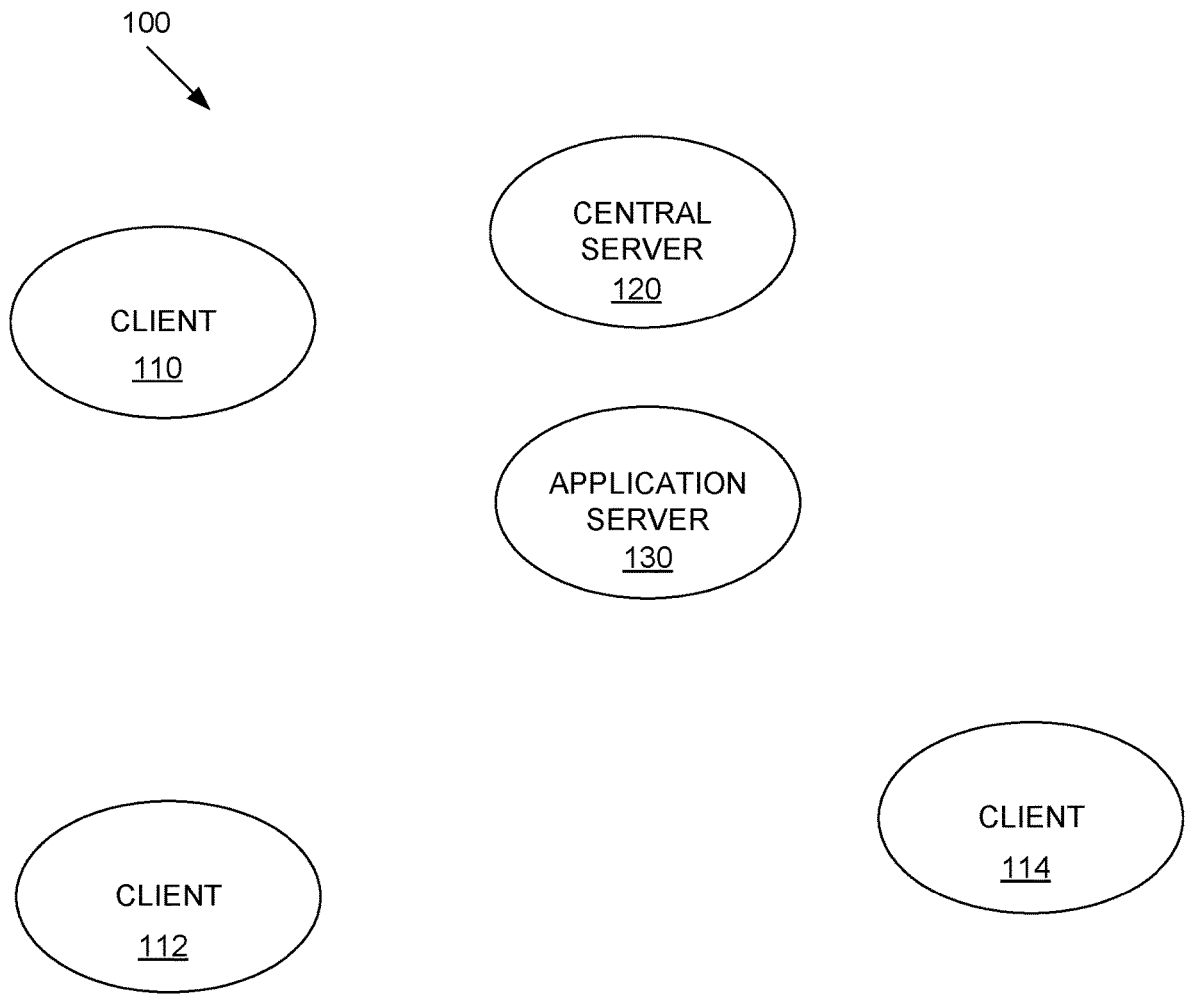
FIG. 1 is a diagram that depicts a system that manages communications between registered users and non-registered users of a collaboration service.

FIG. 1 is a diagram that depicts a system 100 that manages communications between registered users and non-registered users of a collaboration service. A user communicates with the system 100 through a client device, e.g., client devices 110, 112, or 114. A client device may be a desktop, laptop, tablet, or mobile device. A user may be a registered user who has access to and/or credentials for the collaboration service. Alternatively, a user may be a non-registered user who does not have access to and/or credentials for the collaboration service. The client device 110 is associated with a registered user, while the client devices 112 and 114 are associated with non-registered users. The registered user of the client device 110 may communicate with the system 100 through a native application installed on the client device 110 or by logging in to a web-based service portal.

The system 100 also includes a central server 120 and an application server 130. The central server 120 and the application server 130 are depicted as separate components in the system 100. In an alternative configuration, the central server 120 and the application server 130 may be the same component. The application server 130 hosts the collaboration service. The central server 120 provides user access control for registered users and manages the communication between the registered users and non-registered users. The central server 120 may be a real or virtual server host running a server application.

Figure 2:
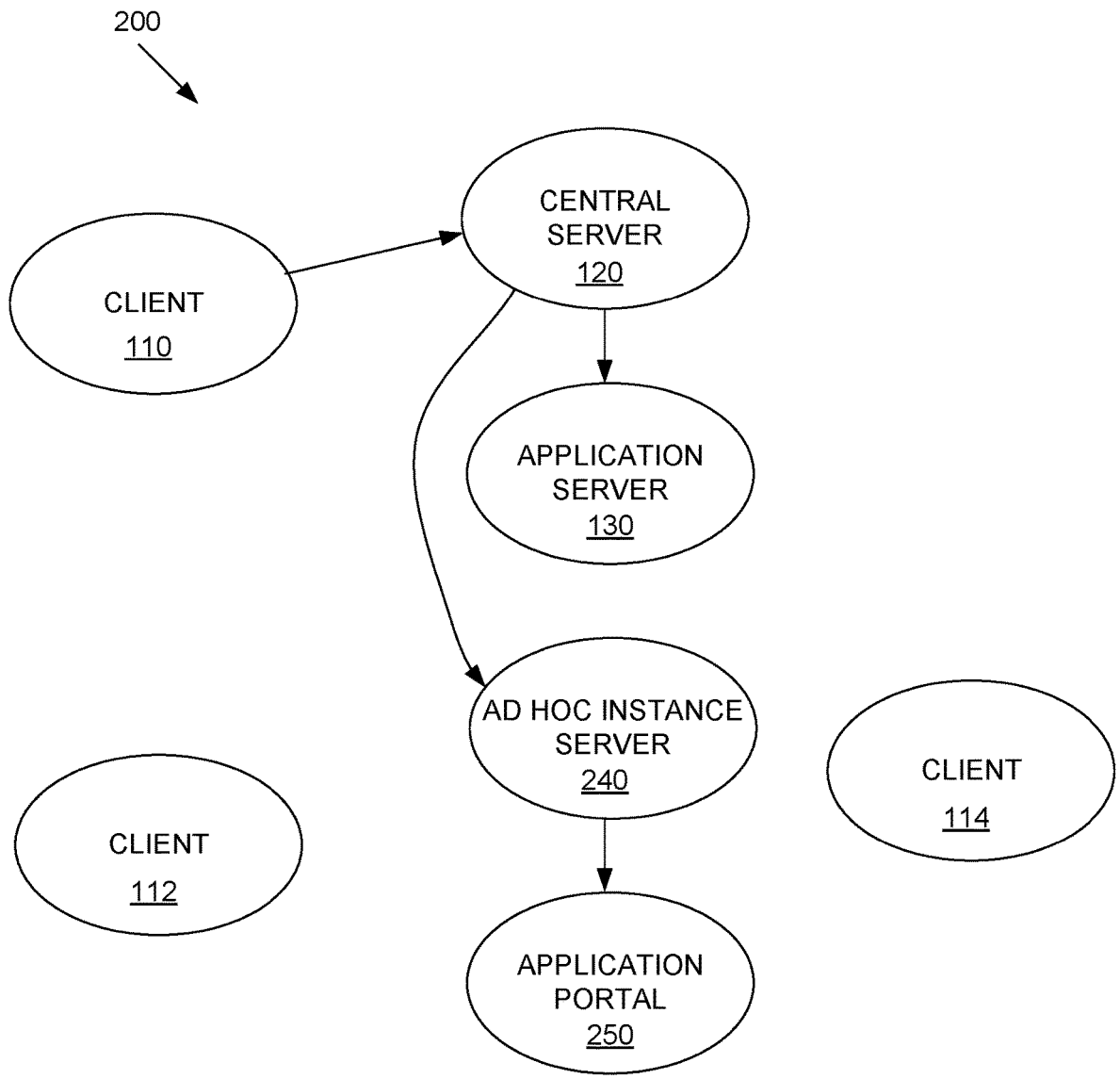
FIG. 2 is a diagram that depicts steps that a registered user may initiate in order to communicate with non-registered users.

FIG. 2 is a diagram that depicts steps initiated by a registered user to communicate with non-registered users that take place in a system 200. In addition to the components shown in the system 100, the system 200 further includes an ad hoc instance server 240 and an application portal 250. The ad hoc instance server 240 may or may not be hosted on the same physical instance as the central server 120.

When the registered user associated with the client device 110 wishes to communicate with a non-registered user, the registered user, through the client device 110, launches a native application installed on the client device 110. When the native application is launched, the client device 110 connects through the central server 120 to the application server 130. Through the native application, the registered user invites the non-registered user to communicate. The client device 110 sends a request to the central server 120 indicating that the registered user wishes to communicate with the non-registered users that correspond to the client devices 112 and 114. A user interface associated with the native application may allow the user to click a button on an invite window. Any similar mechanism may be used to indicate that the registered user wishes to communicate with non-registered users. The request includes contact information associated with a non-registered user, e.g., an email address or a mobile telephone number. In response to the request, and based on the contact information, the central server 120 sends a command to the ad hoc instance server 240 to configure and deploy a single-use application portal, pre-provisioned with one-time-use credentials.

The ad hoc instance server 240 deploys the application portal 250 in response to the command. Based on system requirements, the application portal 250 may be selected from a pool of pre-allocated application portal instances, or alternatively, may be built as required. The choice between the two alternatives may result in a trade-off between speed of deployment and operational expense. For example, using pre-allocated application portal instances may make the operation more expensive while increasing the speed of deployment. Conversely, building application portal instances as required may make the operation less expensive while decreasing the speed of deployment.

The application portal 250 may be one or more single-use user-access application portals, deployed on demand as Platform-as-a-Service (PaaS) or Software-as-a-Service (SaaS) instances, or other means of deploying small software containers.

Figure 3:
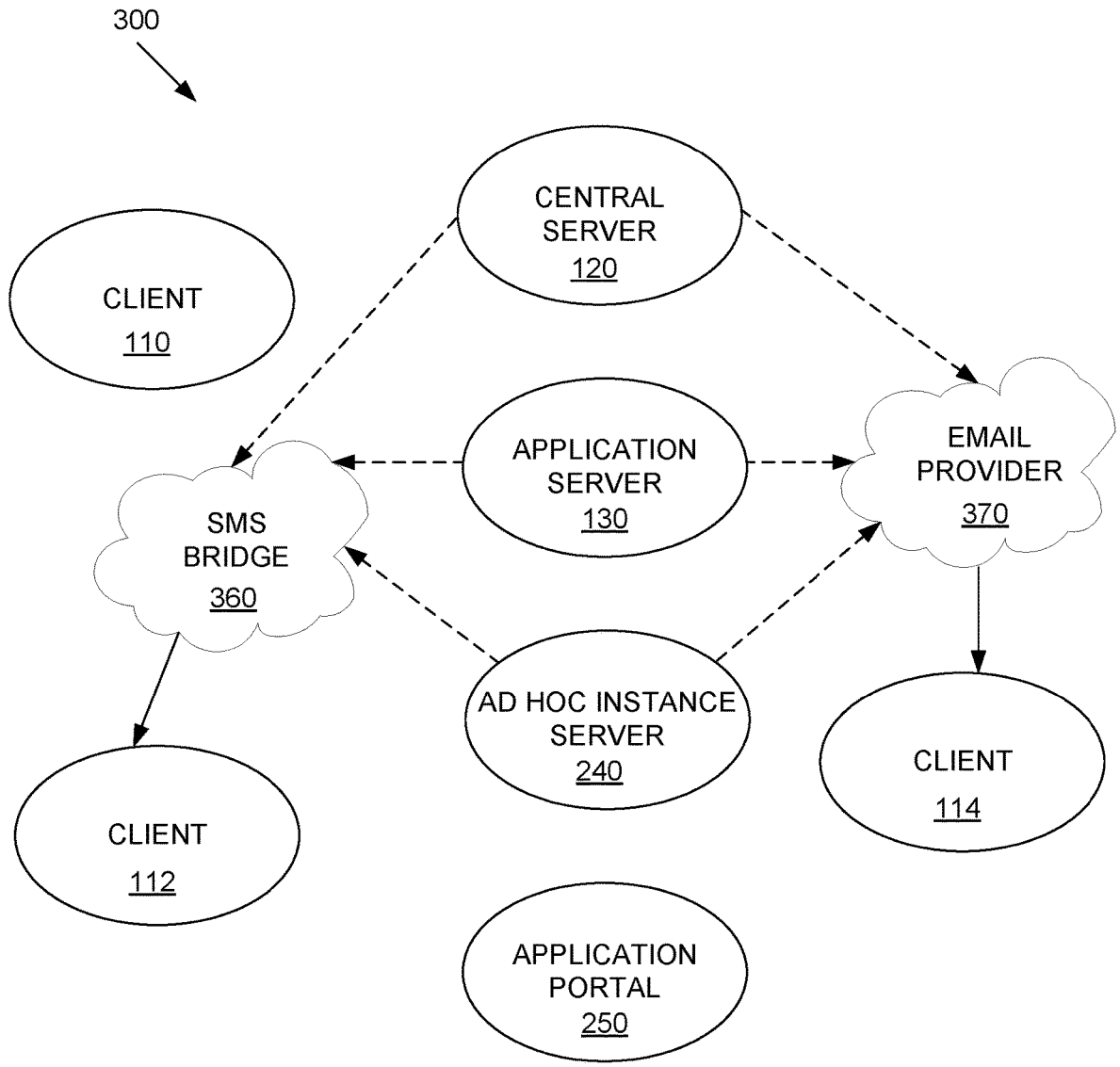
FIG. 3 is a diagram that depicts a next set of steps that occur as a result of the registered user initiating communication with non-registered users.

FIG. 3 is a diagram that depicts a next set of steps that occur as a result of the registered user initiating communication with the non-registered users. Once the application portal 250 is fully deployed and configured, the non-registered users of client devices 112 and 114 receive a message that includes a unique uniform resource locator (URL) that provides access to the application portal 250. The message may be delivered in a short message service (SMS) text message via an SMS bridge 360, an email via an email provider 370, or via another convenient data-transfer medium. The message may be sent by any one of the central server 120, the application server 130, or the ad hoc instance server 240, as shown by the dotted lines in FIG. 3.

When the message is received by the client devices 112 and 114, the non-registered users can select the URL. Once the URL is selected, a web browser on each of the client devices 112 and 114 will automatically connect to the application portal 250. The message may include credential information for accessing the application portal 250, such as an address, username, password, or key. The application portal 250 may use modern HTML5 and/or other web technologies to interact with the non-registered user's client device as required by the collaboration service. As one example, if the collaboration service is an audio chat, the application portal 250 may need to use a microphone on the client device 112 or 114. An another example, if the collaboration service is a video chat, the application portal 250 may need to use a web camera on the client device 112 or 114. The application portal 250 transfers data to and from the single-use application instance opened in the web browser on each of the client devices 112 and 114 and the central server 120.

Figure 4:
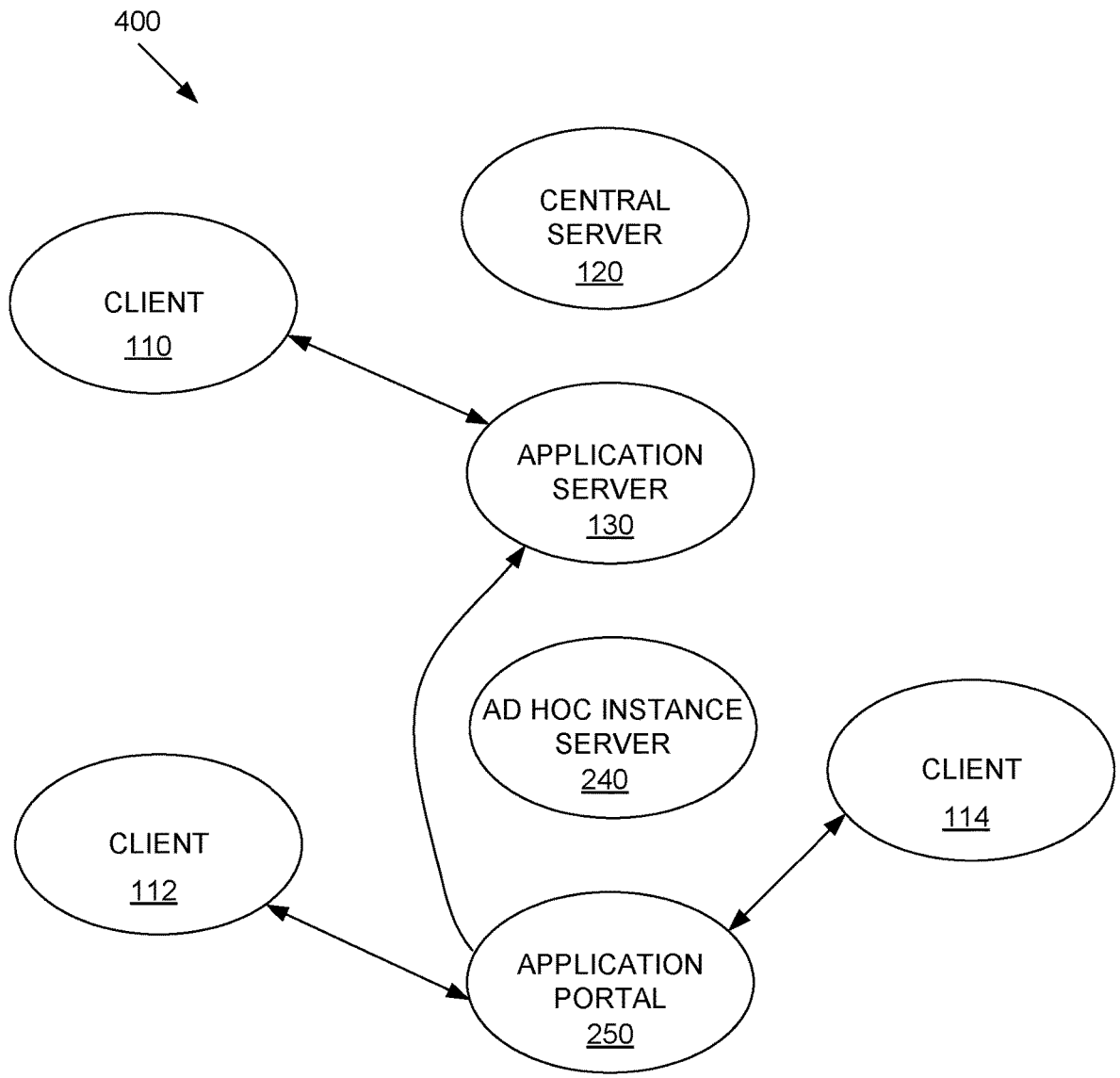
FIG. 4 depicts how the users, both registered and non-registered, connect to the system in order to collaborate with each other.

FIG. 4 depicts how the users, both registered and non-registered, connect to the system in order to collaborate with each other. The registered user of client device 110 connects to the system directly through the application server 130. Non-registered users of client devices 112 and 114 connect indirectly to the application server 130 by connecting directly to the application portal 250 through the web browser on each client device 112 and 114. The application portal 250 can communicate with the application server 130. Thus an indirect connection can be established between the client devices 112 and 114 and the application server 130, eliminating the need for the non-registered users to have credentials for and/or access to the collaboration service hosted by the application server 130.

When the collaboration activity is complete, the non-registered users of the client devices 112 and 114 can close the application instance running in their web browser. When the user closes the web browser, the single-use instance can be shut down by the system and deleted. No trace of the communication path between the recipient user, i.e., the non-registered user, and the initiating user, i.e., the registered user, exists. The only evidence of interaction between the recipient and the collaboration service is a URL that no longer functions and reveals no hints as to the nature of the interaction.

There are multiple benefits to using the system depicted in FIGS. 1-4. As one example, collaboration among users in the system is seamless. Registered users and non-registered users are able to collaborate using the same collaboration service, even though the manner in which they connect to the system is different. As a second example, communication in the system is secure. Due to the transitory and concealable nature of the application instance deployed to each non-registered user, access to the collaboration service exists only as long as a web browser is launched with a link to the application. The link is unique and disposable.

Figure 5:
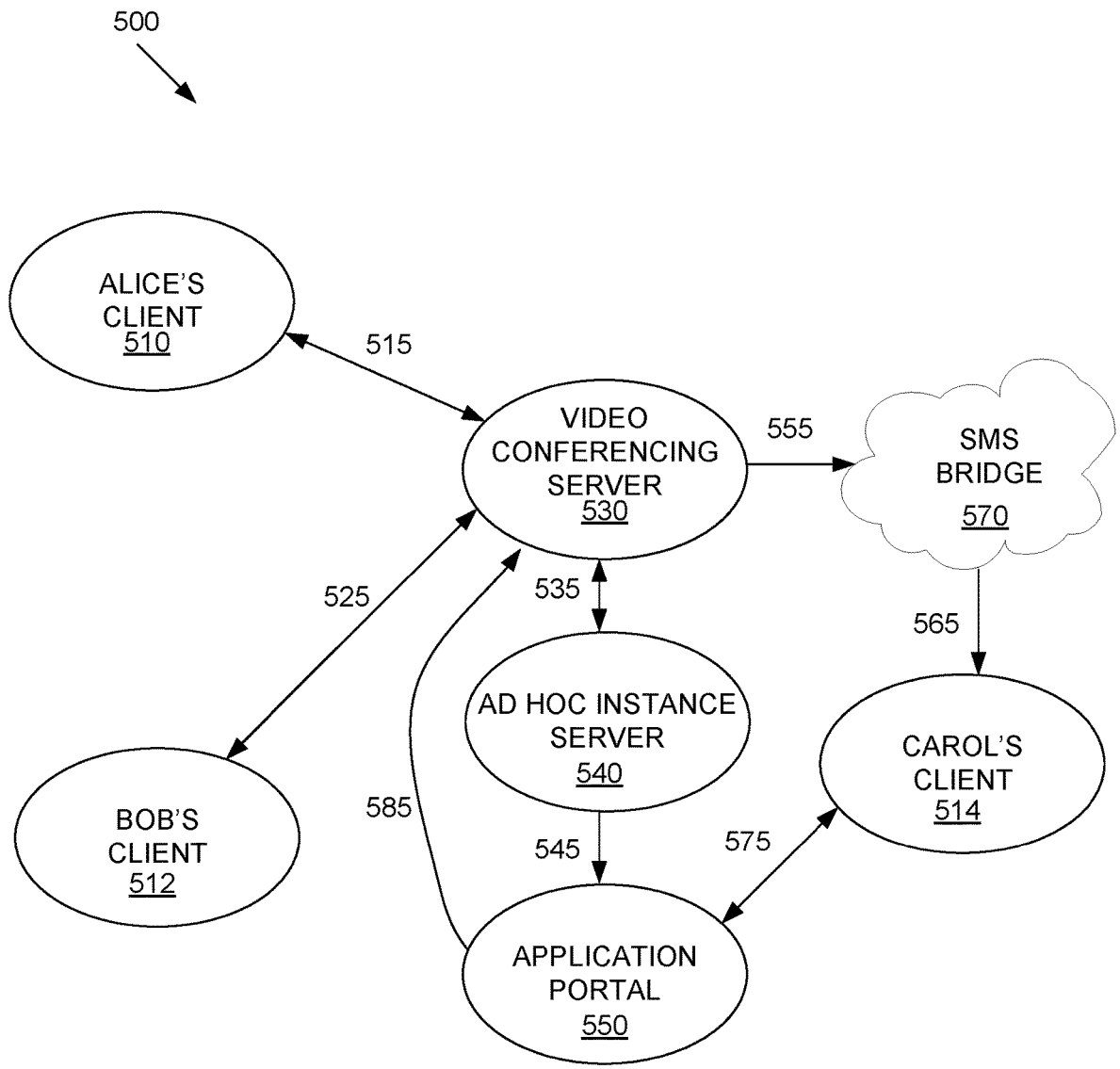
FIG. 5 depicts an execution of an exemplary collaboration scenario.

FIG. 5 depicts a system 500 for an execution of an exemplary collaboration scenario. FIG. 5 depicts similar system components as depicted in FIGS. 1-4. Alice, a registered user of a video conferencing service, wishes to collaborate with Bob, a registered user, and Carol, a non-registered user. Alice and Bob both have a video conferencing application installed on their client devices 510 and 512. Carol, a non-registered user associated with client device 514, has no knowledge of the existence or location of the video conferencing server 530, no credentials, and no user account associated with the video conferencing service.

At a specified meeting time, Alice, at 515, and Bob, at 525, connect directly to the video conferencing server 530 through the video conferencing application installed on their client devices 510 and 512. Alice uses the video conferencing application to indicate that she would like to collaborate with Carol. For example, Alice may click on an "Invite" button in the video conferencing application. Upon clicking, a dialog may open. Through the dialog, Alice is able to enter contact information for Carol, e.g., Carol's mobile telephone number. Once the contact information is entered, Alice may confirm it.

At 535, the video conferencing server communicates with an ad hoc instance server 540 that is responsible for building, configuring, and deploying application portal instances. The ad hoc instance server 540 builds an application portal instance or allocates a pre-built application portal instance. An application portal instance 550 is configured and deployed at 545 with a unique URL and other pertinent information required to communicate with the video conferencing server 530.

At 555, the video conferencing server 530 sends a message that includes the unique URL to Carol via an SMS bridge 570. At 565, Carol's client device 514 receives the message including the URL from the SMS bridge 570. Carol taps on the received URL to open it in a web browser installed on Carol's client device 514. Carol's client device 514 connects to the system at 575 through the application portal 550. The application portal 550 communicates directly with the video conferencing server 530 at 585. The application instance running in the web browser on Carols's client device 514 accesses the camera on the device and connects Carol with the already-running video conference with Alice and Bob.

Carol's client device 514 is not directly connected to the video conference server 530. Instead, the data sent and received by Carol's client device 514 is proxied through the application portal 550. When the conference is concluded, Carol closes the web browser. The system 500 detects that Carol is no longer connected, and it deletes the application portal 550. If Carol or another person tries to access the system using the URL, it will not be valid, and no information about Carol's interaction with Alice and with the system will be revealed. Further, Carol will not be able to reveal any information about the location, IP address, or URL of the video conference server 530, because Carol's client device 514 only reached the video conferencing server 530 by way of direct connection to the deleted application portal instance 550.

Figure 6:
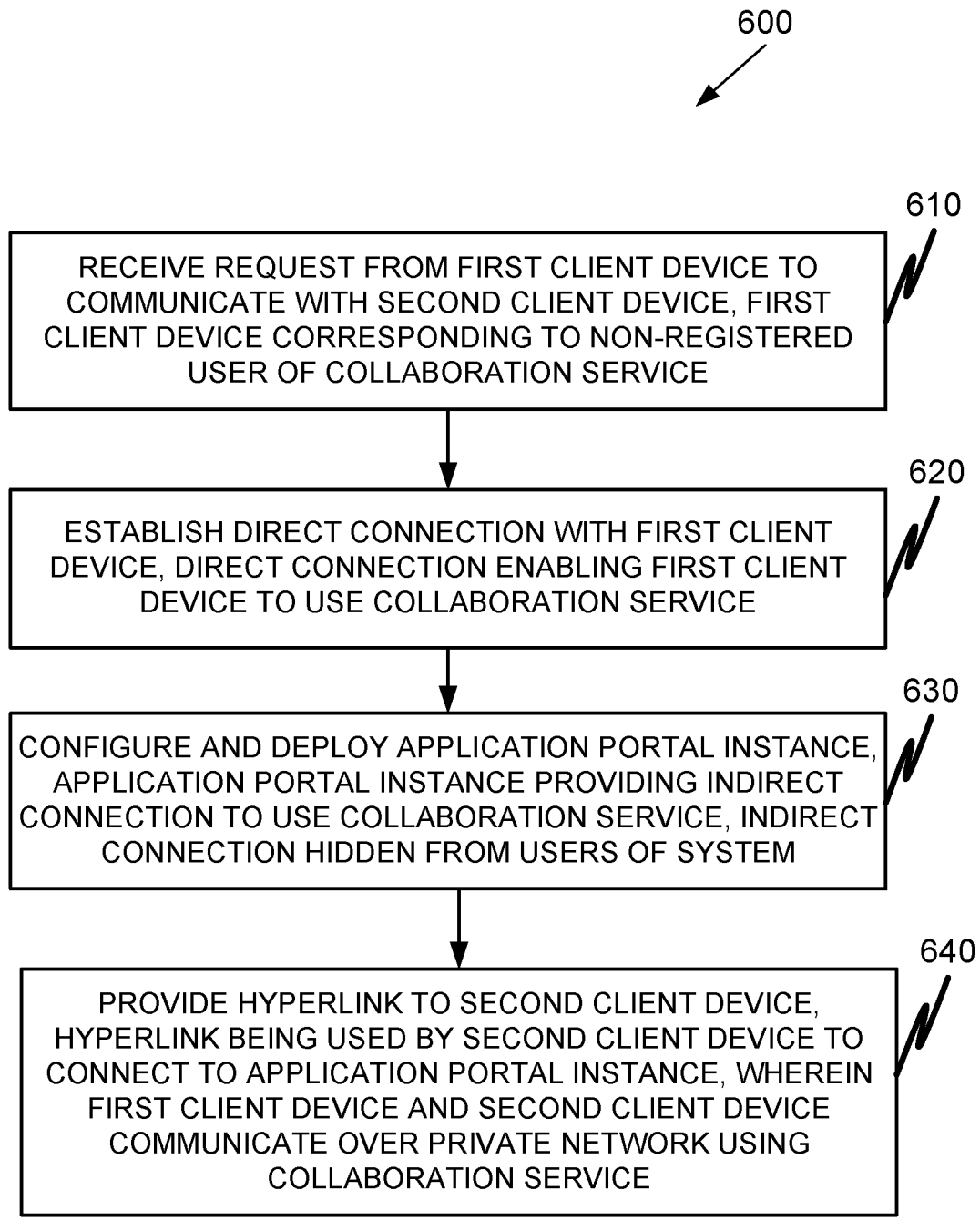
FIG. 6 is a flow diagram that depicts the steps in a method for facilitating communication between users of a collaboration service on a private network.

FIG. 6 is a flow diagram 600 that depicts the steps in a method for facilitating communication between users of a collaboration service on a private network. At 610, a request is received from a first client device to communicate with a second client device. The first client device corresponds to a registered user of the collaboration service. A direct connection with the first client device is established at 620. The direct connection enables the first client device to use the collaboration service. At 630, an application portal instance is configured and deployed. The application portal instance provides an indirect connection to use the collaboration service, and the indirect connection is hidden from users of the system. A hyperlink is provided to the second client device at 640. The hyperlink is used by the second client device to connect to the application portal instance. The first client device and the second client device communicate over the private network using the collaboration service.

Examples have been used to describe the invention herein, and the scope of the invention may include other examples.

It is claimed:

1. A method for facilitating communication between users of a collaboration service on a private network, comprising:
   receiving a request from a first client device to communicate with a second client device, the first client device corresponding to a registered user of the collaboration service, the second client device corresponding to a non-registered user of the collaboration service;
   establishing a direct connection with the first client device, the direct connection enabling the first client device to use the collaboration service;
   configuring and deploying, in response to receiving the request, an application portal instance, the application portal instance being a platform as a service (PaaS) providing an indirect, single-use connection to use the collaboration service, the indirect connection hidden from users of the system; and
   providing, after the configuration and deployment of the application portal instance, a hyperlink to the second client device, the hyperlink being used by the second client device to connect to the application portal instance;
   causing, in response to selection of the hyperlink, the second client device to automatically connect to the application portal instance via a web browser being executed on the second client device; and
   shutting down and deleting the application portal instance when the web browser being executed on the second client device is closed;
   wherein:
      the first client device and the second client device communicate over the private network such that the registered user of the first client device collaborates with the non-registered user of the second client device using the collaboration service;
      the second client device communicates over the private network without a native version of the collaboration service installed.

2. The method of claim 1, further comprising:
   generating a hyperlink corresponding to the application portal instance, wherein upon activation of the hyperlink, the second client device is configured to connect to the application portal instance and communicate over the private network.

3. The method of claim 1, wherein the application portal instance is provisioned ad hoc upon receipt of a message indicating that the first client device wishes to communicate with the second client device, and wherein the application portal instance is provisioned prior to deploying.

4. The method of claim 1, wherein the application portal instance is selected from a set of pre-configured application portal instances, and wherein the application portal instance is selected prior to deploying.

5. The method of claim 1, wherein the collaboration service provides any one or more of the features from the group comprising: video conferencing; voice group conferencing; person-to-person telephony; group text chat rooms; person-to-person text chat; file sharing in either direction; sender-controlled email that can be read and replied to; and virtual desktop infrastructure.

6. A system for facilitating communication between users of a collaboration service on a private network, the system comprising:
   at least one data processor; and
   memory storing instructions which, when executed by at least one data processor, result in operations comprising:
      receiving a request from a first client device to communicate with a second client device, the first client device corresponding to a registered user of the collaboration service, the second client device corresponding to a non-registered user of the collaboration service;
      establishing a direct connection with the first client device, the direct connection enabling the first client device to use the collaboration service;
      configuring and deploying, in response to receiving the request, an application portal instance, the application portal instance being a platform as a service (PaaS) providing an indirect, single-use connection to use the collaboration service, the indirect connection hidden from users of the system; and
      providing, after the configuration and deployment of the application portal instance, a hyperlink to the second client device, the hyperlink being used by the second client device to connect to the application portal instance;
      causing, in response to selection of the hyperlink, the second client device to automatically connect to the application portal instance via a web browser being executed on the second client device; and
      shutting down and deleting the application portal instance when the web browser being executed on the second client device is closed;
   wherein:
      the first client device and the second client device communicate over the private network such that the registered user of the first client device collaborates with the non-registered user of the second client device using the collaboration service; and
      the second client device communicates over the private network without a native version of the collaboration service installed.

7. The system of claim 6, wherein the operations further comprise:
   generating a hyperlink corresponding to the application portal instance, wherein upon activation of the hyperlink, the second client device is configured to connect to the application portal instance and communicate over the private network.

8. The system of claim 6, wherein the application portal instance is provisioned ad hoc upon receipt of a message indicating that the first client device wishes to communicate with the second client device, and wherein the application portal instance is provisioned prior to deploying.

9. The system of claim 6, wherein the application portal instance is selected from a set of pre-configured application portal instances, and wherein the application portal instance is selected prior to deploying.

10. The system of claim 6, wherein the collaboration service provides any one or more of the features from the group comprising: video conferencing; voice group conferencing; person-to-person telephony; group text chat rooms; person-to-person text chat; file sharing in either direction; sender-controlled email that can be read and replied to; and virtual desktop infrastructure.

11. A non-transitory computer-readable medium encoded with instructions for commanding one or more data processors to execute steps of a method for facilitating communication between users of a collaboration service on a private network, the method comprising:
   receiving a request from a first client device to communicate with a second client device, the first client device corresponding to a registered user of the collaboration service, the second client device corresponding to a non-registered user of the collaboration service;
   establishing a direct connection with the first client device, the direct connection enabling the first client device to use the collaboration service;
   configuring and deploying, in response to receiving the request, an application portal instance, the application portal instance being a platform as a service (PaaS) providing an indirect, single-use connection to use the collaboration service, the indirect connection hidden from users of the system;
   providing, after the configuration and deployment of the application portal instance, a hyperlink to the second client device, the hyperlink being used by the second client device to connect to the application portal instance;
   causing, in response to selection of the hyperlink, the second client device to automatically connect to the application portal instance via a web browser being executed on the second client device; and
   shutting down and deleting the application portal instance when the web browser being executed on the second client device is closed;
   wherein:
      the first client device and the second client device communicate over the private network such that the registered user of the first client device collaborates with the non-registered user of the second client device using the collaboration service; and
      the second client device communicates over the private network without a native version of the collaboration service installed.

12. The non-transitory computer-readable medium of claim 11, the method further comprising:
   generating a hyperlink corresponding to the application portal instance, wherein upon activation of the hyperlink, the second client device is configured to connect to the application portal instance and communicate over the private network.

13. The non-transitory computer-readable medium of claim 11, wherein the application portal instance is provisioned ad hoc upon receipt of a message indicating that the first client device wishes to communicate with the second client device, and wherein the application portal instance is provisioned prior to deploying.

14. The non-transitory computer-readable medium of claim 11, wherein the application portal instance is selected from a set of pre-configured application portal instances, and wherein the application portal instance is selected prior to deploying.

15. The non-transitory computer-readable medium of claim 11, wherein the collaboration service provides any one or more of the features from the group comprising: video conferencing; voice group conferencing; person-to-person telephony; group text chat rooms; person-to-person text chat; file sharing in either direction; sender-controlled email that can be read and replied to; and virtual desktop infrastructure.

* * * * *